(12) United States Patent
Nakamura et al.

(10) Patent No.: US 7,379,226 B2
(45) Date of Patent: May 27, 2008

(54) VARIABLE OPTICAL ATTENUATOR

(75) Inventors: Teruhisa Nakamura, Shizuoka (JP); Hidenori Nakata, Aichi (JP); Kenji Sahara, Shizuoka (JP); Yuko Ohta, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 11/881,875

(22) Filed: Jul. 30, 2007

(65) Prior Publication Data

US 2008/0037098 A1    Feb. 14, 2008

Related U.S. Application Data

(63) Continuation of application No. PCT/JP2006/301447, filed on Jan. 30, 2006.

(51) Int. Cl.
*G02F 1/09* (2006.01)
*G02B 5/30* (2006.01)

(52) U.S. Cl. ...................... 359/283; 359/484
(58) Field of Classification Search ............. 359/283, 359/484

See application file for complete search history.

(56) References Cited

U.S. PATENT DOCUMENTS

| | | | |
|---|---|---|---|
| 6,654,167 B2 * | 11/2003 | Yamamoto | 359/484 |
| 6,870,675 B2 * | 3/2005 | Ikeda et al. | 359/484 |
| 2003/0058533 A1 | 3/2003 | Ikeda et al. | |
| 2003/0137718 A1 | 7/2003 | Ohido et al. | |
| 2004/0027637 A1 | 2/2004 | Sahashi et al. | |
| 2004/0193280 A1 | 9/2004 | Webster et al. | |
| 2005/0141075 A1 | 6/2005 | Sahashi et al. | |

FOREIGN PATENT DOCUMENTS

| | | |
|---|---|---|
| CN | 001434327 A | 8/2003 |
| JP | 2002-148578 A | 5/2002 |
| JP | 2002-258229 A | 9/2002 |
| JP | 2003-107420 A | 4/2003 |
| JP | 2004-157494 A | 6/2004 |
| WO | WO-02/14939 A1 | 2/2002 |

* cited by examiner

*Primary Examiner*—Jordan M. Schwartz
*Assistant Examiner*—James C Jones
(74) *Attorney, Agent, or Firm*—Harness, Dickey & Pierce, PLC

(57) ABSTRACT

A variable optical attenuator comprising a separation/combination birefringent element, fixed polarization rotation means, a convex lens, variable polarization rotation means, and a mirror which are arranged in that order. The fixed polarization rotation means has a compensation film Faraday element placed in a cylindrical permanent magnet, and the variable polarization rotation means has a base film Faraday element that is placed outside the cylindrical permanent magnet, and an electromagnet applying a variable magnetic field thereto. Thereby, both the Faraday elements are magnetized in directions different from each other.

6 Claims, 3 Drawing Sheets

VARIABLE OPTICAL ATTENUATOR

CROSS-REFERENCE TO RELATED APPLICATIONS

The present application is a continuation of International Application PCT/JP06/301447, with an international filing date of Jan. 30, 2006, which is herein incorporated by reference. The present application claims priority from Japanese Patent Applications No. 2005-023373 filed on Jan. 31, 2005, which is herein incorporated by reference.

BACKGROUND OF THE INVENTION

1. Field of the Invention

The present invention relates to a reflection type variable optical attenuator.

2. Related Art

Optical communication systems or optical measuring systems need a variable optical attenuator for controlling the amount of transmitted light. A typical example of such a variable optical attenuator is an opposed type that has a polarizer and an analyzer placed on the optical axis in front of and behind (on the input and output sides) variable polarization rotation means (a Faraday rotation angle varying device). The variable polarization rotation means has an electromagnet, etc., applying a magnetic field externally to a Faraday element (such as a magnetic garnet single crystal film having a Faraday effect) and controls the Faraday rotation angle of light passing through the Faraday element by varying the applied magnetic field. By this control of the Faraday rotation angle, the variable optical attenuator variably controls the attenuation of light.

In these years, as wavelength multiplex communications are coming into practical use, an optical attenuator is provided for each wavelength to make insertion loss even for the wavelengths. In such a usage, it is particularly important that the optical attenuator is inexpensive to produce and can be made smaller in size. Conventional variable optical attenuators of the opposed type need a broad space for fibers to be laid in, except where their input and output are arranged opposite each other, resulting in less degrees of freedom in mounting.

As technology to solve this problem, there has been proposed a reflection type variable optical attenuator wherein a separation/combination birefringent element, a lens, and a mirror are arranged in that order and an input port and an output port are provided on the front side of the separation/combination birefringent element and wherein the attenuation of incident light is adjustable by controlling the rotation angles of the polarization directions by use of variable polarization rotation means provided in between the separation/combination birefringent element and the mirror. Refer to Japanese Patent Application Laid-Open Publication No. 2003-107420. This reference also discloses technology wherein a combination of a base film Faraday element whose Faraday rotation angle varies according to a variable magnetic field and a compensation film Faraday element whose Faraday rotation angle does not vary depending on the variable magnetic field is provided thereby achieving a high attenuation and widening the range in which the attenuation is variable.

In such a variable optical attenuator, the Faraday rotational directions of the base film Faraday element and of the compensation film Faraday element must be opposite to each other. Thus, the composition is different between the base film Faraday element and the compensation film Faraday element, and thus producing conditions are different. Hence, the base film Faraday element and the compensation film Faraday element are separately produced. Therefore, the base film Faraday element and the compensation film Faraday element are different in wavelength-dependent loss and temperature-dependent loss, and a difference in Faraday rotation angle occurs depending on conditions of wavelength and temperature. Thus, the maximum attenuation peak shifts against the drive current, resulting in a bad effect on optical characteristics of the variable optical attenuator such as the reduction of the attenuation range. Therefore, it is difficult to widen the range of operating temperatures and the range of operating wavelengths.

SUMMARY OF THE INVENTION

A task of the present invention is to provide a variable optical attenuator whose maximum attenuation peak position is substantially the same irrelevantly of conditions of wavelength and temperature and which is good in optical characteristics while being inexpensive and small in size.

According to an aspect of the present invention, there is provided a variable optical attenuator comprising a separation/combination birefringent element of a parallel plane type that separates lights of orthogonal polarization directions on a same optical path and combines lights on different optical paths, a light converging lens, a mirror placed on the opposite side of the light converging lens from the separation/combination birefringent element and at a focal position of the lens, variable polarization rotation means and fixed polarization rotation means placed at positions in between the separation/combination birefringent element and the mirror, and an input port and an output port provided on an end face of the separation/combination birefringent element. The variable polarization rotation means comprises a base film Faraday element of which a Faraday rotation angle varies according to a variable combined magnetic field, and variable magnetic field applying means that applies two or more magnetic fields of different directions externally to the base film Faraday element and can vary a combined magnetic field thereof. The fixed polarization rotation means comprises a compensation film Faraday element of which a Faraday rotation angle hardly varies and a Faraday rotation direction is the same as that of the base film Faraday element, and a hollow cylindrical permanent magnet that applies a magnetic field externally to the compensation film Faraday element. The compensation film Faraday element is placed in the cylindrical permanent magnet and the base film Faraday element is placed outside the cylindrical permanent magnet such that both the Faraday elements are magnetized in directions different from each other, and by controlling the rotation angles of the polarization directions with the variable polarization rotation means, the amount of reflected output light is controlled.

Preferably, the fixed polarization rotation means is placed in between the separation/combination birefringent element and the lens, and the variable polarization rotation means is placed in between the lens and the mirror, and an auxiliary permanent magnet is placed behind the mirror to magnetize the base film Faraday element in a direction opposite to that of the compensation film Faraday element.

The base film Faraday element and the compensation film Faraday element may be a Bi-displaced rare-earth iron garnet LPE film in composition, and it may be that the base film Faraday element has been annealed and the compensation film Faraday element has not been annealed and has a characteristic of being larger in magnetic anisotropy than the base film Faraday element.

Preferably, the difference in magnitude between the Faraday rotation angles of the compensation film Faraday element of the fixed polarization rotation means and of the base film Faraday element when a variable magnetic field is not applied thereto of the variable polarization rotation means is within ±2 degrees. Further, preferably the Faraday rotation angle of the polarization directions in the base film Faraday element of the variable polarization rotation means when traveling forth and back is at a maximum of 90 degrees or greater.

A two-core ferrule may be so arranged that an input fiber is located at the input port and an output fiber is located at the output port. Of course, a light waveguide or the like may be used instead of the optical fiber.

In the variable optical attenuator according to the present invention, the Faraday rotation directions of the base film Faraday element and the compensation film Faraday element are opposite when magnetized in opposite directions, and the same when magnetized in the same direction. Hence, both the Faraday elements can be made of the same material, and thus are the same in wavelength-dependent loss and temperature-dependent loss. Accordingly, the maximum attenuation peak positions against the drive current coincide irrelevantly of conditions of wavelength and temperature. Therefore, high attenuation is achieved and good optical characteristics are obtained.

Features and objects of the present invention other than the above will become clear by reading the description of the present specification with reference to the a accompanying drawings.

EXPLANATION OF REFERENCE NUMERALS

10 Separation/combination birefringent element; 12 Fixed polarization rotation means; 14 Convex lens; 16 Variable polarization rotation means; 18 Mirror; 20 Input fiber; 22 Output fiber; 30 Cylindrical permanent magnet; 32 Compensation film Faraday element; 34 Base film Faraday element; 36 Auxiliary permanent magnet; 38 Electromagnet

DETAILED DESCRIPTION OF THE INVENTION

At least the following matters will be made clear by the explanation in the present specification and the description of the accompanying drawings.

Figure 1:
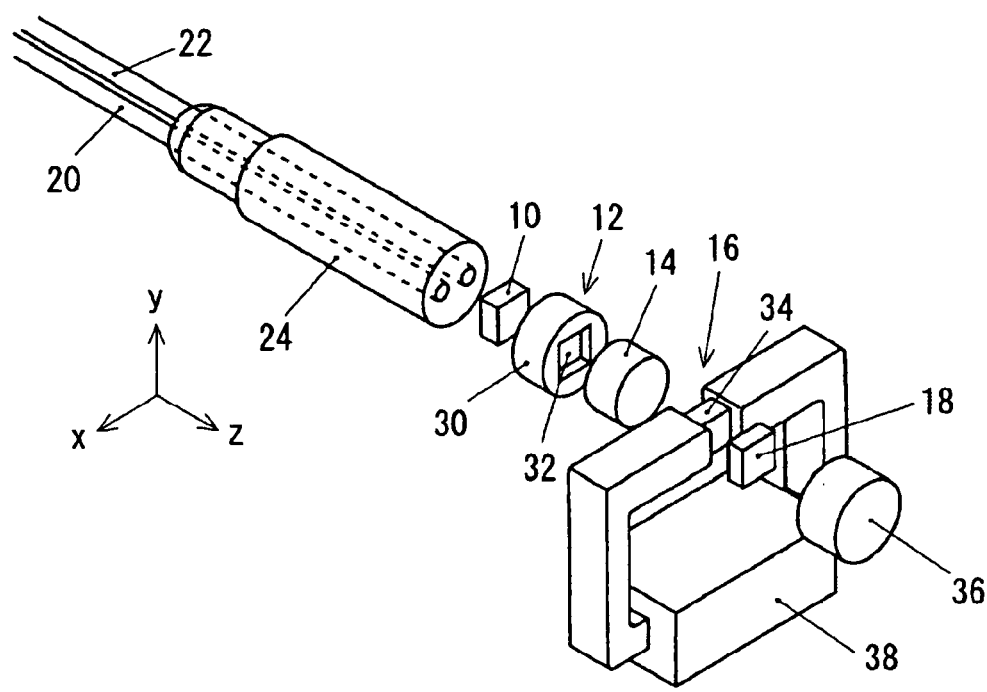
FIG. 1 is a schematic view of the configuration of a variable optical attenuator according to an aspect of the present invention.
Figure 2:
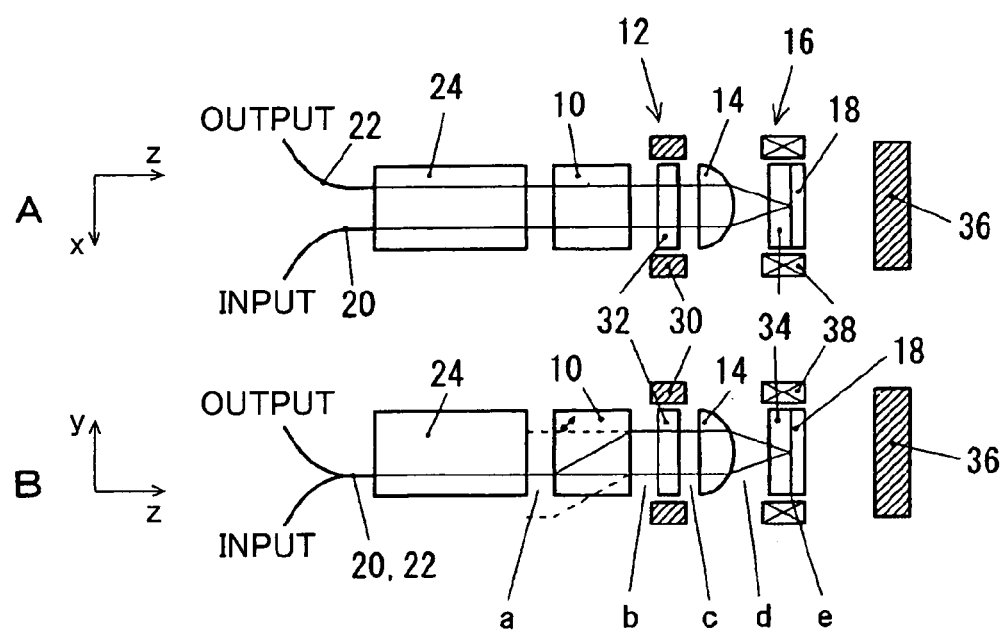
FIG. 2 shows the optical paths of the variable optical attenuator of FIG. 1.

The configuration of a typical example of a variable optical attenuator according to the present invention is schematically shown in FIG. 1. Its optical paths are shown in FIG. 2. For easy understanding of description, the axes of coordinates are set as follows. Let a z direction (toward the right in the drawing) indicate the direction in which optical elements are arranged (the direction in which incident light propagates) and an x direction (horizontal direction) and a y direction (vertical direction) indicate two directions orthogonal thereto. Thus, A of FIG. 2 shows a plan view and B shows a front view.

In this variable optical attenuator, a separation/combination birefringent element 10 that separates in the y direction lights traveling on the same optical path in the z direction and whose polarization directions are orthogonal to each other, fixed polarization rotation means 12, a convex lens 14, variable polarization rotation means 16, and a mirror 18 placed at the focal position of the convex lens 12 are arranged in that order. An input port and an output port are provided on a side face (left side face in the drawing) of the separation/combination birefringent element 10. In this example, a two-core ferrule 24 is so arranged that an input fiber 20 is located at the input port of the lower right optical path as viewed in the z direction and that an output fiber 22 is located at the output port of the lower left optical path.

The separation/combination birefringent element 10 of a parallel plane type is made of a rutile crystal, for example. The parallel plane type means that the entrance plane and the exit plane for light are parallel to each other, and includes a parallel plate type, a parallelepiped shape, a rectangular parallelepiped shape, and the like.

The fixed polarization rotation means 12 has a compensation film Faraday element 32 placed in a hollow cylindrical permanent magnet 30. The cylindrical permanent magnet 30 is magnetized in its axis direction. The variable polarization rotation means 16 has a base film Faraday element 34 which is located outside the cylindrical permanent magnet 30 and to which is applied a combined magnetic field of a fixed magnetic field and a variable magnetic field in two different directions. The fixed magnetic field is applied in a direction of light propagation by the cylindrical permanent magnet 30 and a circular plate-like auxiliary permanent magnet 36 behind the mirror. The variable magnetic field is applied by an electromagnet 38 in a direction perpendicular to the direction of light propagation. A combined magnetic field of these two magnetic fields is applied to the base film Faraday element 34, and the Faraday rotation angle of the base film Faraday element 34 varies according to the combined magnetic field. Meanwhile, the Faraday rotation angle of the compensation film Faraday element 32 remains substantially constant.

For the compensation film Faraday element 32 and the base film Faraday element 34, Faraday elements of the same Faraday rotation direction are used. As mentioned above, the compensation film Faraday element 32 is placed in the cylindrical permanent magnet 30 and the base film Faraday element 34 is located outside the cylindrical permanent magnet 30. Hence, when the variable magnetic field is at zero, the Faraday elements 32, 34 are magnetized in directions 180 degrees different from each other and are opposite to each other in Faraday rotation direction.

The incident light passes through the separation/combination birefringent element 10 and the lens 14 and is focused on and reflected by the mirror 18. The reflected return light passes through the lens 14 and the separation/combination birefringent element 10 and exits. During this process, the light travels forth and back between the fixed polarization rotation means 12 and the variable polarization rotation means 16 (actually between the compensation film Faraday element 32 and the base film Faraday element 34). Thus, in this invention, one birefringent element functions two ways as a polarizer and an analyzer. With the variable optical attenuator according to the present invention, by controlling the rotation angles of the polarization directions with use of the base film Faraday element 34, the amount of reflected output light is controlled.

Bi-displaced rare-earth iron garnet LPE films of the same composition may be used for the base film Faraday element and the compensation film Faraday element. In this case, a heat process (annealing) is performed on the base film Faraday element, and the compensation film Faraday element without a heat process being performed thereon has a characteristic of being larger in magnetic anisotropy than the base film Faraday element. By this means, the temperature-dependent loss coefficient and wavelength-dependent loss coefficient of the Faraday rotation angle are completely the same between both the Faraday elements. Hence, their loss coefficients cancel out when their Faraday rotation angles are the same.

The compensation film Faraday element placed in the cylindrical permanent magnet is subject to the effect of the magnetization distribution inside the magnet, so that magnetically saturated part and magnetically unsaturated part may occur. In this state, magnetic domains occur in the Faraday element, causing the degradation of extinction rate. Furthermore, the Faraday rotation angle varies depending on the in-plane distribution of magnetization directions of the compensation film Faraday element, thus producing a difference in rotation angle from the base film Faraday element. However, as in the above example, if material of high magnetic anisotropy is used for the compensation film Faraday element, these problems can be prevented.

If the difference in Faraday rotation angle between the compensation film Faraday element of the fixed polarization rotation means and the base film Faraday element of the variable polarization rotation means when the variable magnetic field is not applied is within ±2 degrees, an attenuation decreasing type of variable optical attenuator is obtained. Further, the Faraday rotation angles of the polarization directions in the base film Faraday element of the variable polarization rotation means when traveling forth and back are set at a maximum of 90 degrees or greater. By this means, the maximum insertion loss and the minimum insertion loss become available.

EXAMPLES

Figure 3:
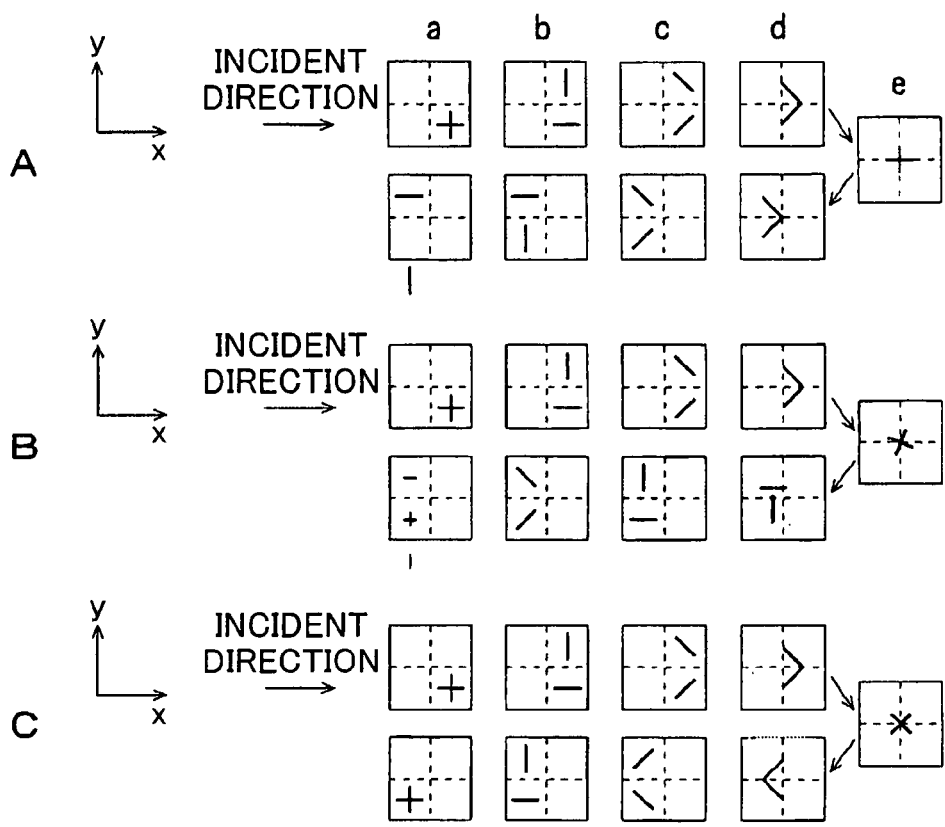
FIG. 3 illustrates the polarization at between the optical elements of a first example.

As to a first example of the variable optical attenuator having such a structure, the operation will be described. The first example is of the attenuation decreasing type and set as follows:

the rotation angle of the base film Faraday element is at ±45 to 0 degrees (the rotation angle after traveling forth and back being at ±90 to 0 degrees), and the rotation angle of the compensation film Faraday element is at −45 degrees (the rotation angle after traveling forth and back being at −90 degrees). FIG. 3 illustrates the polarization at between the optical elements, and the polarization directions indicated by a to d are those as viewed in the propagation direction of light at the positions indicated by a to d of B in FIG. 2.

(Case of the rotation angle of the base film Faraday element being at +45 degrees, i.e., the total Faraday rotation angle being at 0 degrees)

First, the case where the total Faraday rotation angle of the base film Faraday element 34 and the compensation film Faraday element 32 is at 0 degrees is shown in A of FIG. 3. This is the state where the drive current of the electromagnet is at zero (i.e., the variable magnetic field is at zero), and thereby only the fixed magnetic field is applied to the base film Faraday element 34 so that its magnetization direction is in the propagation direction of light and 180 degrees different from that of the compensation film Faraday element 32.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. They are reflected by the mirror 18 at the focal position of the lens without their polarization directions being rotated in total because the total Faraday rotation angle is at 0 degrees. The reflected rays returning in the −z direction pass through the base film Faraday element 34, the convex lens 14, and the compensation film Faraday element 32 again. Also during this, their polarization directions are not rotated in total. Then, in the separation/combination birefringent element 10, the ordinary ray on the upper optical path travels straight, and the extraordinary ray on the lower optical path is refracted and shifted in the −y direction. Therefore, most of light incident through the input fiber 20 does not couple to the output fiber 22. That is, the light incident through the input fiber 20 is attenuated to almost zero.

(Case of the rotation angle of the base film Faraday element being 0 degrees, i.e., the total Faraday rotation angle being at −45 degrees)

Next, the case where the total Faraday rotation angle of the base film Faraday element 34 and the compensation film Faraday element 32 is at −45 degrees is shown in C of FIG. 3. This is the state where the drive current of the electromagnet is large enough that the base film Faraday element 34 is magnetized in a direction perpendicular to the light propagation direction.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. Their polarization directions are rotated through −45 degrees because the total Faraday rotation angle is set at −45 degrees and they reach the mirror 18 at the focal position of the lens and are reflected. The reflected rays returning in the −z direction pass through the base film Faraday element 34, the convex lens 14, and the compensation film Faraday element 32 again. During this, their polarization directions are rotated further through −45 degrees (−90 degrees in total). Then, in the separation/combination birefringent element 10, an ordinary ray on the lower optical path travels straight, and an extraordinary ray on the upper optical path is refracted and shifted in the −y direction. Therefore the rays are combined and couples to the output fiber 22. In this way, where the total Faraday rotation angle is at −45 degrees, almost all of the light incident through the input fiber 20 exits into the output fiber 22 without being attenuated.

(Case of the rotation angle of the base film Faraday element being at +22.5 degrees, i.e., the total Faraday rotation angle being at −22.5 degrees)

If the total Faraday rotation angle of the base film Faraday element 34 and the compensation film Faraday element 32 is at any angle in between −45 to 0 degrees, the operations are as follows. This is the state where the base film Faraday element 34 is magnetized in a direction at an angle corresponding to the drive current of the electromagnet relative to the light propagation direction. For example, the case of being at −22.5 degrees is shown in B of FIG. 3.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. Their polarization directions are rotated through a certain angle (through −22.5 degrees in B of FIG. 3) by the compensation film Faraday element 32 and the base film Faraday element 34, and they reach the mirror 18 at the focal position of the lens and are reflected. The reflected rays returning in the −z direction pass through the base film Faraday element 34, the convex lens 14, and the compensation film Faraday element 32 again. During this, their polarization directions are rotated further through the same angle (here −22.5 degrees, thus −45 degrees in total). Then, in the separation/combination birefringent element 10, an ordinary ray component on the lower optical path travels straight, and an extraordinary ray component on the upper optical path is refracted and shifted in the −y direction. Hence, these ray components are combined and couple to the output fiber 22. However, an ordinary ray component on the upper optical path travels straight, and an extraordinary ray component on the lower optical path is refracted and shifted in the −y direction. Hence, these ray components do not couple to the output fiber 22. Therefore, the light incident through the input fiber 20 is attenuated (nearly in half where the Faraday rotation angle is at 22.5 degrees) and exits into the output fiber 22.

In this way, by controlling the rotation angles of the polarization directions with the base film Faraday element 34, the attenuation of the incident light (or the amount of reflected output light) can be adjusted freely.

Figure 4:
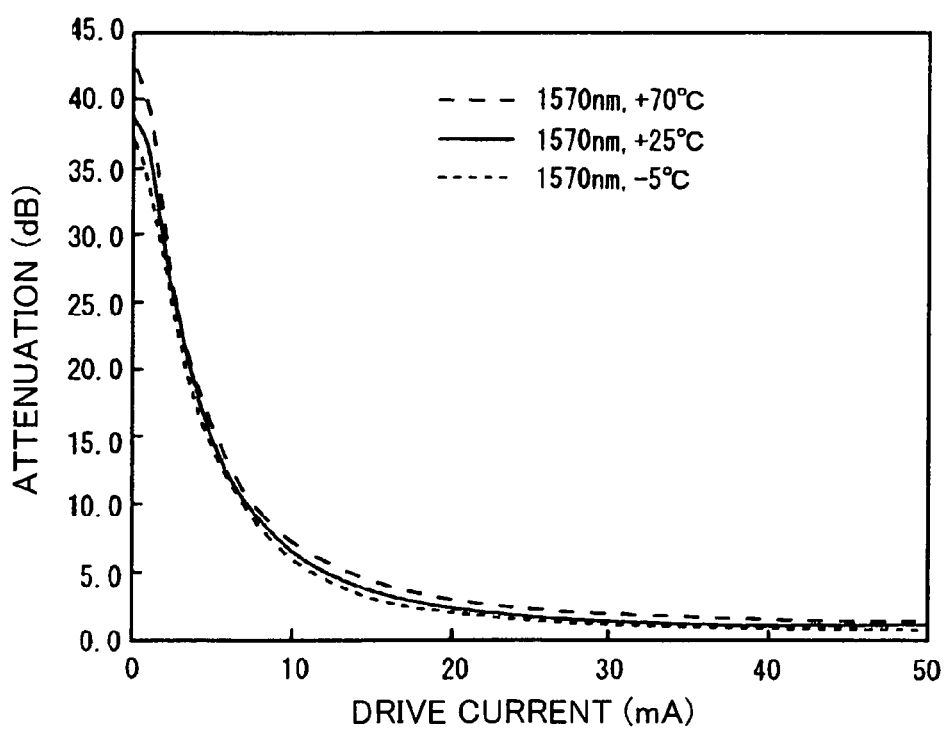
FIG. 4 is a drive current versus attenuation characteristic graph for the first example.

FIG. 4 shows results of measuring variation in attenuation against the drive current of the electromagnet (thus the intensity of the variable magnetic field) where light having a wavelength of 1570 nm was used and the temperature was set at −5° C., +25° C. (room temperature), or +75° C. When no variable magnetic field was applied, an attenuation of 35 dB or greater was obtained, and it is seen that the peak positions of the attenuation coincide irrelevantly of the temperature change. That is, with this variable optical attenuator, the light can be shut off with a high attenuation (an attenuation of 35 dB or greater) and without being affected by changes in a condition of temperature.

Figure 5:
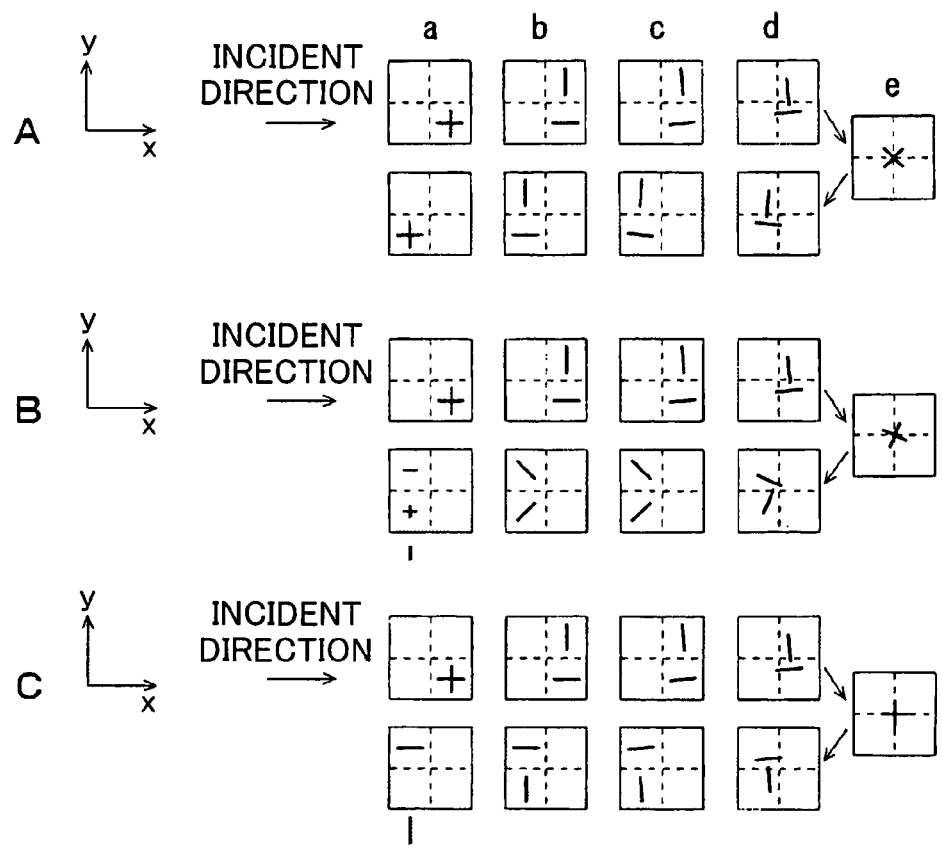
FIG. 5 illustrates the polarization at between the optical elements of a second example.

As to a second example of the variable optical attenuator having the same structure, the operation will be described. The second example is set as follows:

the rotation angle of the base film Faraday element is at 0 to +50 degrees (the rotation angle after traveling forth and back being at 0 to +100 degrees), and the rotation angle of the compensation film Faraday element is at −5 degrees (the rotation angle after traveling forth and back being at −10 degrees). FIG. 5 illustrates the polarization at between the optical elements, and the polarization directions indicated by a to d are those as viewed in the propagation direction of light at the positions indicated by a to d of B in FIG. 2.

(Case of the rotation angle of the base film Faraday element being at +50 degrees, i.e., the total Faraday rotation angle being at +45 degrees)

First, the case where the total Faraday rotation angle of the base film Faraday element 14 and the compensation film Faraday element 16 is at +45 degrees is shown in A of FIG. 5. This is the state where the drive current of the electromagnet is at zero (i.e., the variable magnetic field is at zero), and thereby only the fixed magnetic field is applied to the base film Faraday element 34 so that its magnetization direction is in the propagation direction of light and 180 degrees different from that of the compensation film Faraday element 32.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. Their polarization directions are rotated through +45 degrees because the total Faraday rotation angle is set at +45 degrees, and they reach the mirror 18 at the focal position of the lens and are reflected. The reflected rays returning in the −z direction pass through the base film Faraday element 34, the convex lens 14, and the compensation film Faraday element 32 again. During this, their polarization directions are rotated further through +45 degrees (+90 degrees in total). Then, in the separation/combination birefringent element 10, an ordinary ray on the lower optical path travels straight, and an extraordinary ray on the upper optical path is refracted and shifted in the −y direction. Therefore, the rays are combined and couples to the output fiber 22. In this way, where the total Faraday rotation angle is at 45 degrees, almost all of the light incident through the input fiber 20 exits into the output fiber 22 without being attenuated.

(Case of the rotation angle of the base film Faraday element being at +5 degrees, i.e., the total Faraday rotation angle being at 0 degrees)

Next, the case where the total Faraday rotation angle of the base film Faraday element 34 and the compensation film Faraday element 32 is at 0 degrees is shown in C of FIG. 5. This is the state where the drive current of the electromagnet is large enough that the base film Faraday element 34 is magnetized in a direction perpendicular to the light propagation direction.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. They are reflected by the mirror 18 at the focal position of the lens without their polarization directions being rotated in total because the total Faraday rotation angle is set at 0 degrees. The reflected rays returning in the −z direction pass through the base film Faraday element 34, the convex lens 14, and the compensation film Faraday element 32 again. Also during this, their polarization directions are not rotated in total. Then, in the separation/combination birefringent element 10, the ordinary ray on the upper optical path travels straight, and the extraordinary ray on the lower optical path is refracted and shifted in the −y direction. Therefore, most of light incident through the input fiber 20 does not couple to the output fiber 22. That is, the light incident through the input fiber 20 is attenuated to almost zero.

(Case of the rotation angle of the base film Faraday element being at +27.5 degrees, i.e., the total Faraday rotation angle being at +22.5 degrees)

If the total Faraday rotation angle of the base film Faraday element 34 and the compensation film Faraday element 32 is at any angle in between −5 to +45 degrees, the operations are as follows. This is the state where the base film Faraday element 34 is magnetized in a direction at an angle corresponding to the drive current of the electromagnet relative to the light propagation direction. For example, the case of being at +22.5 degrees is shown in B of FIG. 5.

Of light incident in the z direction through the input fiber 20, an ordinary ray travels straight through the separation/combination birefringent element 10, and an extraordinary ray is refracted and separated in the y direction therein. Then, they pass through the compensation film Faraday element 32, are converged by the convex lens 14, and while converging, they pass through the base film Faraday element 34. Their polarization directions are rotated through a certain angle (through +22.5 degrees in B of FIG. 5) by the compensation film Faraday element 32 and the base film Faraday element 34, and they reach the mirror 18 at the focal position of the lens and are reflected. The reflected rays returning in the −z direction pass through the base film Faraday element 34, the convex lens 14, and the compensation film Faraday element 32 again. During this, their polarization directions are rotated further through the same angle (here +22.5 degrees, thus +45 degrees in total). Then, in the separation/combination birefringent element 10, an ordinary ray component on the lower optical path travels straight, and an extraordinary ray component on the upper optical path is refracted and shifted in the −y direction. Hence, these ray components are combined and couple to the output fiber 22. However, an ordinary ray component on the upper optical path travels straight, and an extraordinary ray component on the lower optical path is refracted and shifted in the −y direction. Hence, these ray components do not couple to the output fiber 22. Therefore, the light incident through the input fiber 20 is attenuated (nearly in half where the Faraday rotation angle is at 22.5 degrees) and exits into the output fiber 22.

In this way, by controlling the rotation angles of the polarization directions with the base film Faraday element 34, the attenuation of the incident light (or the amount of reflected output light) can be adjusted freely.

Figure 6:
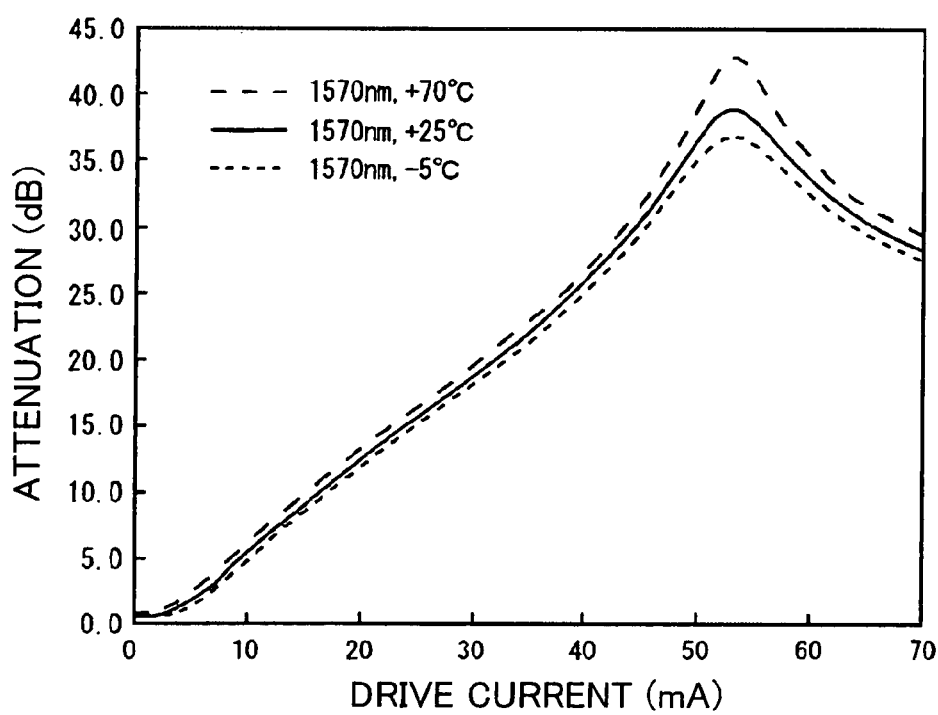
FIG. 6 is a drive current versus attenuation characteristic graph for the second example.

FIG. 6 shows results of measuring variation in attenuation against the drive current of the electromagnet (thus the intensity of the variable magnetic field) where light having a wavelength of 1570 nm was used and the temperature was set at −5° C., +25° C. (room temperature), or +75° C. When such a variable magnetic field was applied that the Faraday rotation angle of the base film Faraday element 34 is at +5 degrees, an attenuation of 35 dB or greater was obtained, and it is seen that the peak positions of the attenuation coincide irrelevantly of the temperature change. That is, with this variable optical attenuator, the light can be shut off with a high attenuation (an attenuation of 35 dB or greater) and without being affected by changes in a condition of temperature.

Although the preferred embodiment of the present invention has been described in detail, it should be understood that various changes, substitutions and alterations can be made therein without departing from spirit and scope of the inventions as defined by the appended claims.

What is claimed is:

1. A variable optical attenuator comprising:
   a separation/combination birefringent element of a parallel plane type that separates lights of orthogonal polarization directions on a same optical path and combines lights on different optical paths;
   a light converging lens;
   a mirror placed on the opposite side of the light converging lens from the separation/combination birefringent element and at a focal position of the lens;
   variable polarization rotation means and fixed polarization rotation means placed at positions in between the separation/combination birefringent element and the mirror; and
   an input port and an output port provided on an end face of the separation/combination birefringent element,
   wherein the variable polarization rotation means comprises a base film Faraday element of which a Faraday rotation angle varies according to a variable combined magnetic field, and variable magnetic field applying means that applies two or more magnetic fields of different directions externally to the base film Faraday element and can vary a combined magnetic field thereof,
   wherein the fixed polarization rotation means comprises a compensation film Faraday element of which a Faraday rotation angle hardly varies and a Faraday rotation direction is the same as that of the base film Faraday element, and a hollow cylindrical permanent magnet that applies a magnetic field externally to the compensation film Faraday element, and
   wherein the compensation film Faraday element is placed in the cylindrical permanent magnet and the base film Faraday element is placed outside the cylindrical permanent magnet such that both the Faraday elements are magnetized in directions different from each other, and by controlling the rotation angles of the polarization directions with the variable polarization rotation means, the amount of reflected output light is controlled.

2. The variable optical attenuator according to claim 1, wherein the fixed polarization rotation means is placed in between the separation/combination birefringent element and the lens, and the variable polarization rotation means is placed in between the lens and the mirror, and an auxiliary permanent magnet is placed behind the mirror to magnetize the base film Faraday element in a direction opposite to that of the compensation film Faraday element.

3. The variable optical attenuator according to claim 1, wherein the base film Faraday element and the compensation film Faraday element are a Bi-displaced rare-earth iron garnet LPE film in composition, and the base film Faraday element has been annealed, and the compensation film Faraday element has not been annealed and has a characteristic of being larger in magnetic anisotropy than the base film Faraday element.

4. The variable optical attenuator according to claim 3, wherein the difference in magnitude between the Faraday rotation angles of the compensation film Faraday element of the fixed polarization rotation means and of the base film Faraday element when a variable magnetic field is not applied thereto of the variable polarization rotation means is within ±2 degrees.

5. The variable optical attenuator according to claim 3, wherein the Faraday rotation angle of the polarization directions in the base film Faraday element of the variable polarization rotation means when traveling forth and back is at a maximum of 90 degrees or greater.

6. The variable optical attenuator according to claim 1, wherein a two-core ferrule is so arranged that an input fiber is located at the input port and an output fiber is located at the output port.

* * * * *